UNITED STATES PATENT OFFICE.

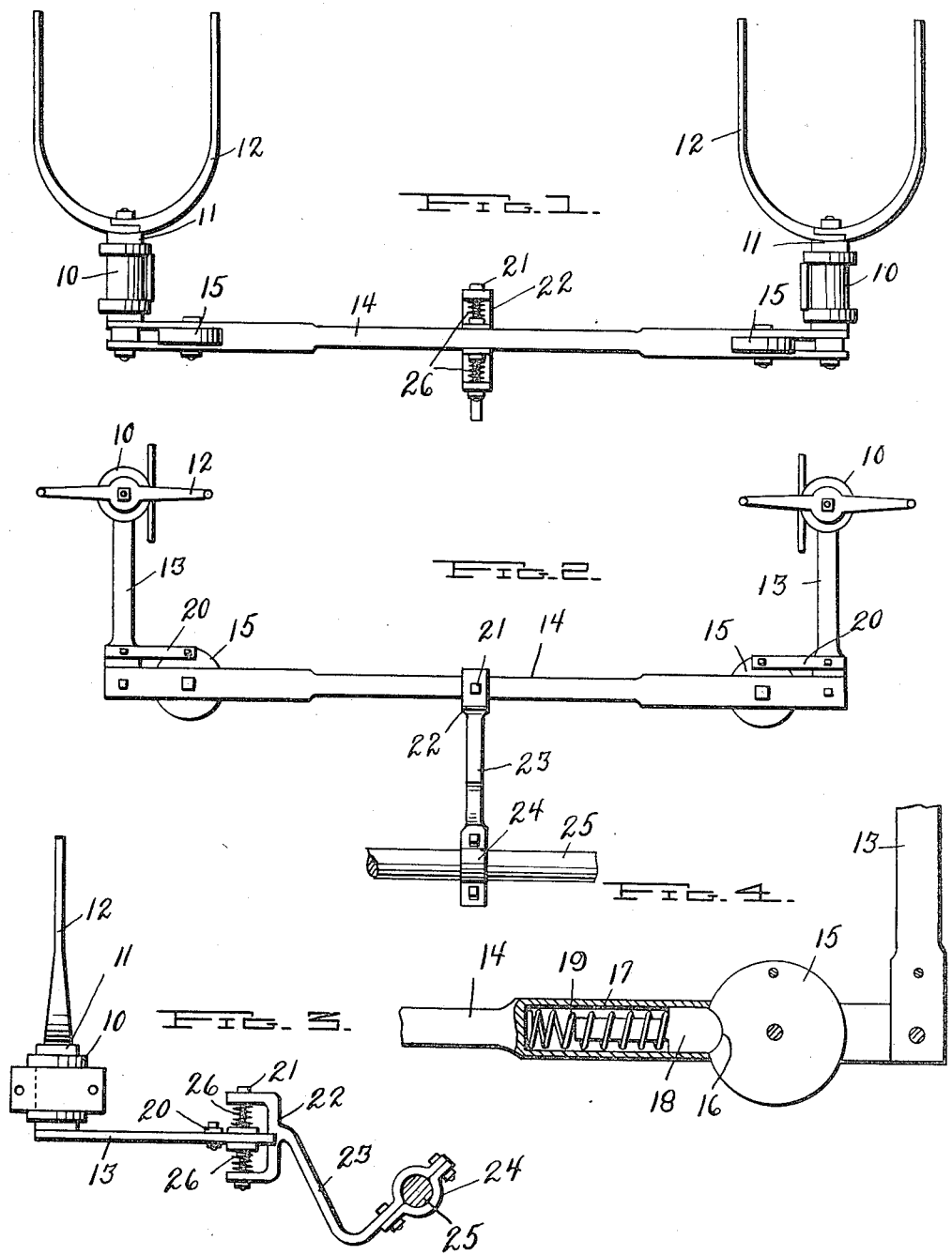

ALEXANDER MABIE, OF SANTA CLARA, CALIFORNIA.

DIRIGIBLE-HEADLIGHT MECHANISM.

1,150,529.   Specification of Letters Patent.   Patented Aug. 17, 1915.

Application filed March 22, 1915.   Serial No. 16,208.

*To all whom it may concern:*

Be it known that I, ALEXANDER MABIE, a citizen of the United States, residing at Santa Clara, in the county of Santa Clara, State of California, have invented certain new and useful Improvements in Dirigible-Headlight Mechanisms; and I do hereby declare the following to be a full, clear, and exact description of the invention, such as will enable others skilled in the art to which it appertains to make and use the same.

This invention relates to improvements in dirigible headlights for automobiles.

The principal object of the invention is to provide a simple and novel construction whereby the lamps are held rigidly in position when the machine is proceeding straight forwardly so as to prevent oscillations of the lamp which occurs with devices of ordinary construction.

Another object is to provide a structure of the above character in which the lamps are readily shifted with the steering mechanism but which will be held in normal position when the automobile is again moving straight forwardly.

Another object is to provide means for protecting the parts from being injured or bent due to up and down movements of the automobile.

Other objects and advantages will be apparent from the following description when taken in connection with the accompanying drawing.

In the drawing: Figure 1 is a front elevation of my improved mechanism for steering the headlights, Fig. 2 is a top plan view, Fig. 3 is a side elevation, and Fig. 4 is an enlarged plan view of a portion of the device, partly broken away to show the spring-pressed block in a notch of the disk.

Referring particularly to the accompanying drawing, 10 represents a pair of tubular brackets which are suitably secured to the automobile and in which are mounted the vertical pintles 11 carrying the forks 12 at their upper ends for supporting the lamps, (not shown). Rigidly secured to each of the pintles 11 is a rearwardly extending arm 13, and pivotally connecting the rear ends of these arms is a transversely disposed bar or rod 14. The portions of the bar which are connected with the arms 13 are bifurcated and, in each of the bifurcations is rotatably mounted a disk 15 in one side of which is formed a notch 16. At the inner end of the bifurcation is a hollow cavity or bore 17 in which is disposed a block 18 urged outwardly into engagement with the edge of the disk by means of a coil spring 19. Pivotally connected to the disk forwardly of its pivot point and to the arm 13 is a link 20, the purpose of which will appear more fully hereinafter.

Extending vertically through the central portion of the bar 14 is a pin or bolt 21, the upper and lower ends of which are secured within the arms of a fork 22 formed on the forward end of a connecting bar 23, this bar having a clamp 24 at its rear end by means of which it is attached to the transverse rod 25 of the steering gear.

Disposed between the arms of the fork 22 and the bar 14 and encircling the bolt 21 are coil springs 26 which take up the vertical movement of the parts to prevent bending or twisting thereof.

In the normal position of the device, the blocks 18 are engaged in the notches 16 of the disks so that the brackets hold the lamps in position to direct their light straight forwardly. When the steering rod is moved in one direction or the other, the bar 14 will be moved in a corresponding direction rocking the arms 13 so as to rotate the forks 12 and turn the lamps in the direction in which the automobile is proceeding. This movement of the bar 14 by reason of its connection with the arms 13 and by reason of the links 20, will rotate the disks on their pivots and disengage the blocks 18 from the notches. As soon as the machine is turned to proceed straight forwardly the blocks will drop into the notches and hold the arms 13 from any movement tending to oscillate the lamps until they are moved by the steering gear.

What is claimed is:

In a dirigible headlight mechanism, the combination with the oscillating lamp brackets, of a bar pivotally connecting the brackets, disks rotatably mounted on the end portions of the bar, said disks each having a notch in its periphery, spring-pressed members carried by the bar and normally engaging in the notches of the disks, and links pivotally connected to the disks and to the brackets.

In testimony whereof, I affix my signature, in the presence of two witnesses.

ALEXANDER MABIE.

Witnesses:
LUIS G. FATJO,
H. L. WARBURTON.

Copies of this patent may be obtained for five cents each, by addressing the "Commissioner of Patents, Washington, D. C."